F. A. GARDNER.
BEARING STEP AND VERTICAL SHAFT.
No. 113,867.            Patented Apr. 18, 1871.
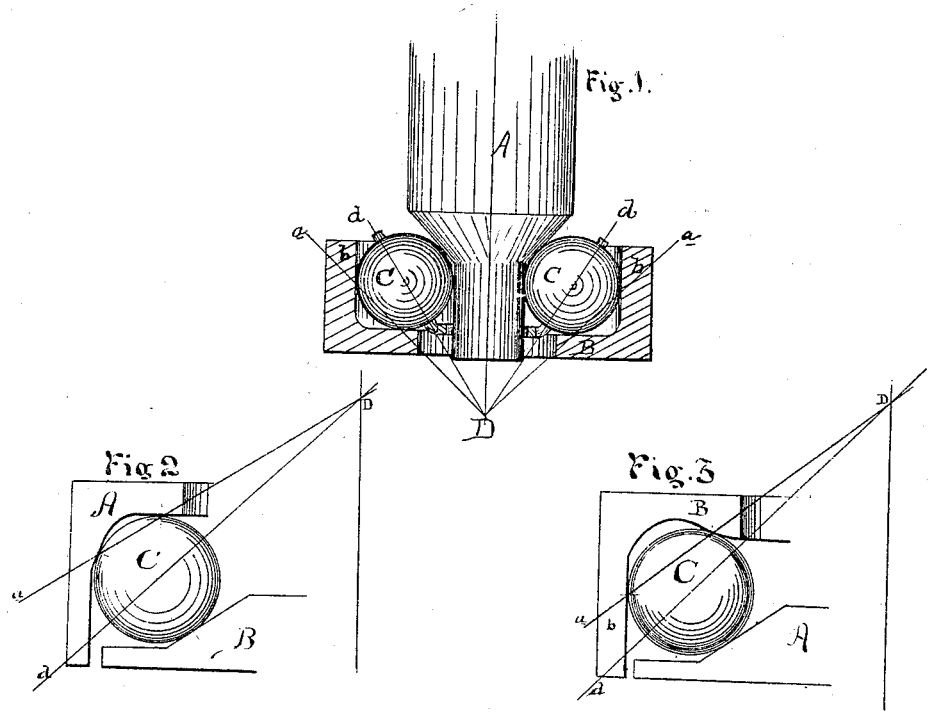
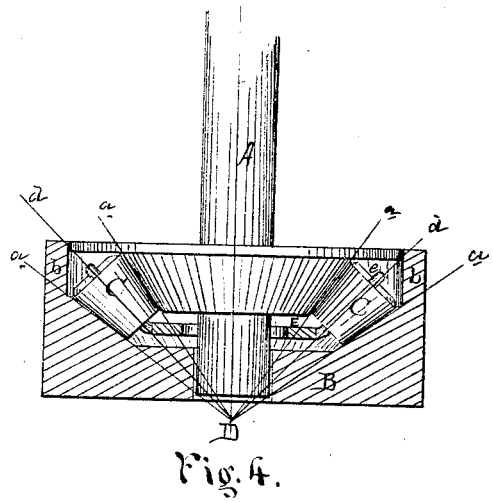
Witnesses.
Inventor
Francis A. Gardner
By his Atty

United States Patent Office.

FRANCIS A. GARDNER, OF DANBURY, CONNECTICUT.

Letters Patent No. 113,867, dated April 18, 1871.

IMPROVEMENT IN BEARING-STEPS AND VERTICAL SHAFTS.

The Schedule referred to in these Letters Patent and making part of the same.

*To all whom it may concern:*

Be it known that I, FRANCIS A. GARDNER, of Danbury, in the county of Fairfield and State of Connecticut, have invented a new and useful Improvement in Bearing-Steps for Vertical Shafts; and I do hereby declare the following to be a full, clear, and exact description of the same, reference being had to the accompanying drawing, in which—

Figure 1 is an elevation showing my invention, the step being in section.

Figures 2 and 3 represent such modifications in the relative positions of the bearing surfaces as may be required by a change of the inclination of the axis.

Figure 4 represents conical rollers instead of spherical ones.

This invention relates to improvements in anti-friction bearings for mechanisms having revolution on vertical axes; and It consists in constructing the bearing surfaces so that friction-rollers may traverse between them and around the prime axis of rotation without slip.

This invention is applicable for steps for all vertical shafts, turbine wheels, millstone spindles, cranes, turn-tables, revolving chairs, &c.

I am aware that friction-rollers—spherical, conical, and cylindrical—have hitherto been employed to support vertical shafts, but said rollers have always, prior to this invention, been arranged to revolve upon axes perpendicular to the prime axis of rotation, and as the more distant parts of said rollers necessarily travel around said prime axis in larger circuits than the inner parts of said rollers, but in equal times and revolutions, it is apparent that considerable friction and slip must ensue. In addition to the slip there is, when conical rollers are employed, an additional amount of friction from the end thrust. The effect of friction produced as above set forth is to destroy the regular form of the rollers or the bearing surfaces, and the apparatus then soon becomes inoperative.

The friction caused by the elasticity or deficient strength of the material employed is not taken into account, as that will be represented by a constantly-varying quantity, dependent upon the material employed and the load to be supported.

That others may more fully understand my invention, I will particularly describe its construction and mode of operation.

If a spherical roller is placed in a rectilinear groove of annular section so that its contact with the sides of said groove will be at two points only, and if said roller is set in motion it will roll along said groove, revolving upon an axis parallel to a line connecting said points of contact, and the motion of said roller will therefore represent the motion of a rolling cylinder. The relative positions of the sides of said groove, either as to the horizon or to each other, will not effect this law.

If, however, the groove is made annular, so that the points on the surface of the roller successively in contact with the sides of the groove will traverse around the prime axis in circles of different diameters, then the axis of the roller will be inclined to the line connecting said points of contact on the surface of the roller, and these two lines will cut each other and the prime axis at the same point. The motion of the roller will then represent the motion of a cone.

From the above it will appear evident that a spherical roller may be caused to roll in an annular groove around the central or prime axis of said groove without slip, its outer part being caused to traverse a larger circuit than its inner part in equal times and revolutions.

The principles above set forth are embodied and made operative in my invention for the purpose of producing frictionless bearings or steps for vertical shafts.

A represents a spindle or upright shaft, which may be supposed to belong to any machine or mechanism in which it would be useful.

The step or seat for the foot of the shaft A is formed by a plate, B, provided with a flange, b. In fig. 1 the flange b is made perpendicular to the surface of the plate B.

The spherical rollers C are placed upon said plate and within said flange, as shown.

The points of contact of the roller and the seat will be upon line a. If the roller C be caused to pass along the surface of B and b, then those points of contact will be transferred along two parallel lines around the surface of said roller, and said lines will, if prolonged, form circles of different diameters. The motion of the roller will then be that of a cone.

These different circles, being parallel, have a common axis, and said axis is that of a cone, which would traverse a similar circuit—i. e., a cone whose apex would touch the prime axis at D.

The line d represents the axis of revolution for the roller C, and the line a represents one side of a cone, such as above described.

I prefer to employ spheres instead of conical rollers because the surface of B or b is always tangential to the surface of the roller at the point of contact.

In fig. 4 conical rollers are shown instead of spheres, and when very heavy shafts are to be supported it may be advantageous to employ them.

The shaft A is formed with a conical foot to rest against the several rollers, as shown, and the surface of said conical foot is calculated at such an angle as will as nearly as possible secure an equal pressure of the roller against the two points of contact when spherical rollers are employed. When conical rollers are employed the foot may be calculated at the angle of the conical rollers.

It will appear evident that when the shaft A revolves the rollers upon which it is supported will also revolve, and will roll along the surface of B and $b$ without slip, and therefore without friction.

If the flange $b$ is perpendicular to the surface B, as shown in fig. 1, then the inclination of the axis $d$ will be about thirty-three degrees to the prime axis, and the inclination of the line $a$ will be forty-five degrees to said prime axis.

In figs. 2 and 3 the roller-axis is drawn at an inclination of forty-five degrees, and the consequent modifications of bearing surfaces are shown.

It will appear from the foregoing description, that the chief virtue of this invention depends upon the proper inclination of the axes of the friction-rollers C; and it is also apparent that, so far as the principles of operation are concerned, it is immaterial whether B is the stationary or the movable part.

The rollers may be placed loosely in the step, and they will there revolve upon their natural axes; but it will be necessary to employ as many as may be necessary to almost fill the annular space, and it is desirable to employ a smaller number, both because it is difficult to attain such accuracy of workmanship as will produce an equal bearing upon them all, and also because there will be a large amount of friction resulting from contact with each other.

To employ a smaller number of rollers it becomes necessary to use some device to maintain them in proper position and prevent them from huddling together. For this purpose I employ the plate with radial arms, $e$, which are bent at an angle coincident with the inclination of the axis $d$; each roller C is then perforated, and one of the arms $e$ inserted to act as an axis.

The plate E is suspended by its arms $e$ in the axial perforations of the rollers, and does not touch either the shaft A or seat B. No labor is therefore required of said plate except to prevent the displacement of the rollers C.

Having described my invention,

What I claim as new is—

1. The manner of application of spherical rollers between bearing surfaces, which are disposed relatively in the manner described, so that each of said rollers can revolve upon its natural axis inclined to the prime axis, as described, to form an anti-friction bearing for mechanisms having revolution in horizontal planes.

2. The step B, constructed with an annular flange, $b$, in combination with the revolving part A constructed with a conical face, and the rollers C revolving upon an axis inclined to the prime axis, the whole to operate substantially as set forth.

F. A. GARDNER.

Witnesses:
J. C. McKINNIE,
GEO. W. TALBOT.